United States Patent
Park et al.

(10) Patent No.: US 12,444,800 B2
(45) Date of Patent: Oct. 14, 2025

(54) BATTERY PACK AND DEVICE INCLUDING THE SAME

(71) Applicant: LG ENERGY SOLUTION, LTD., Seoul (KR)

(72) Inventors: Subin Park, Daejeon (KR); Junyeob Seong, Daejeon (KR); Won Kyoung Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 222 days.

(21) Appl. No.: 17/769,671

(22) PCT Filed: Jul. 1, 2021

(86) PCT No.: PCT/KR2021/008325
§ 371 (c)(1),
(2) Date: Apr. 15, 2022

(87) PCT Pub. No.: WO2022/005218
PCT Pub. Date: Jan. 6, 2022

(65) Prior Publication Data
US 2024/0030536 A1    Jan. 25, 2024

(30) Foreign Application Priority Data

Jul. 1, 2020  (KR) .................. 10-2020-0080829

(51) Int. Cl.
*H01M 50/242*    (2021.01)
*H01M 50/211*    (2021.01)
(Continued)

(52) U.S. Cl.
CPC ....... *H01M 50/242* (2021.01); *H01M 50/211* (2021.01); *H01M 50/264* (2021.01); *H01M 50/289* (2021.01)

(58) Field of Classification Search
CPC ............ H01M 50/242; H01M 50/211; H01M 50/264; H01M 50/289; H01M 50/262;
(Continued)

(56) References Cited

U.S. PATENT DOCUMENTS

2010/0112424 A1   5/2010   Hayashi
2010/0159345 A1   6/2010   Shibata et al.
(Continued)

FOREIGN PATENT DOCUMENTS

CN    207558892 U    6/2018
CN    108448041 A    8/2018
(Continued)

OTHER PUBLICATIONS

DE 102020201139 English translation of description (Year: 2021).*
(Continued)

*Primary Examiner* — Allison Bourke
*Assistant Examiner* — Travis L. Martin
(74) *Attorney, Agent, or Firm* — Birch, Stewart, Kolasch & Birch, LLP

(57) ABSTRACT

A battery pack includes a lower pack housing having a plurality of module regions; a partition wall that partitions the plurality of module regions; a cell block that is mounted in each of the plurality of module regions; and a coupling member that couples the cell block and the partition wall, wherein the cell block includes a battery cell stack formed by stacking a plurality of battery cells; and a side surface plate located between the battery cell stack and the partition wall.

18 Claims, 10 Drawing Sheets

(51) Int. Cl.
*H01M 50/264* (2021.01)
*H01M 50/289* (2021.01)

(58) Field of Classification Search
CPC .... H01M 50/20; H01M 50/204; H01M 50/24; H01M 10/653; H01M 2220/20; Y02E 60/10
See application file for complete search history.

(56) References Cited

U.S. PATENT DOCUMENTS

| | | | |
|---|---|---|---|
| 2017/0117519 A1* | 4/2017 | Schoenherr | H01M 50/271 |
| 2017/0313170 A1 | 11/2017 | Hara et al. | |
| 2018/0034117 A1 | 2/2018 | Bang et al. | |
| 2018/0105062 A1 | 4/2018 | Fees et al. | |
| 2018/0105209 A1 | 4/2018 | Fees et al. | |
| 2018/0108890 A1 | 4/2018 | Fees et al. | |
| 2018/0108891 A1 | 4/2018 | Fees et al. | |
| 2018/0109328 A1 | 4/2018 | Eberhard et al. | |
| 2018/0190965 A1 | 7/2018 | Lee et al. | |
| 2020/0067040 A1 | 2/2020 | Kim et al. | |
| 2020/0161729 A1 | 5/2020 | Kim et al. | |
| 2021/0036280 A1* | 2/2021 | Nishimori | H01M 50/264 |
| 2021/0242527 A1* | 8/2021 | Schmitt | H01M 50/289 |
| 2021/0296728 A1 | 9/2021 | Kim et al. | |
| 2021/0351455 A1 | 11/2021 | Kim et al. | |

FOREIGN PATENT DOCUMENTS

| | | | | |
|---|---|---|---|---|
| CN | 208873804 U | 5/2019 | | |
| CN | 110073513 A | 7/2019 | | |
| CN | 209087948 U | 7/2019 | | |
| CN | 209087962 U | 7/2019 | | |
| CN | 210200841 U | 3/2020 | | |
| CN | 210535732 U | 5/2020 | | |
| CN | 210838029 U | 6/2020 | | |
| CN | 111403651 A | 7/2020 | | |
| DE | 102020201139 A1 * | 8/2021 | ........ | H01M 10/0481 |
| JP | 2008-192551 A | 8/2008 | | |
| JP | 2013-225377 A | 10/2013 | | |
| JP | 2016-219262 A | 12/2016 | | |
| JP | 2018-530877 A | 10/2018 | | |
| JP | 6540588 B2 | 7/2019 | | |
| JP | 2008-277085 A | 7/2025 | | |
| KR | 10-1661972 B1 | 10/2016 | | |
| KR | 10-2018-0133728 A | 12/2018 | | |
| KR | 10-2020-0021609 A | 3/2020 | | |
| KR | 10-2020-0033776 A | 3/2020 | | |
| WO | WO 2020/026961 A1 | 2/2020 | | |

OTHER PUBLICATIONS

Extended European Search Report for European Application No. 21832108.1, dated Jun. 14, 2024.
International Search Report for PCT/KR2021/008325 (PCT/ISA/210) mailed on Oct. 8, 2021.

* cited by examiner

【FIG. 1】
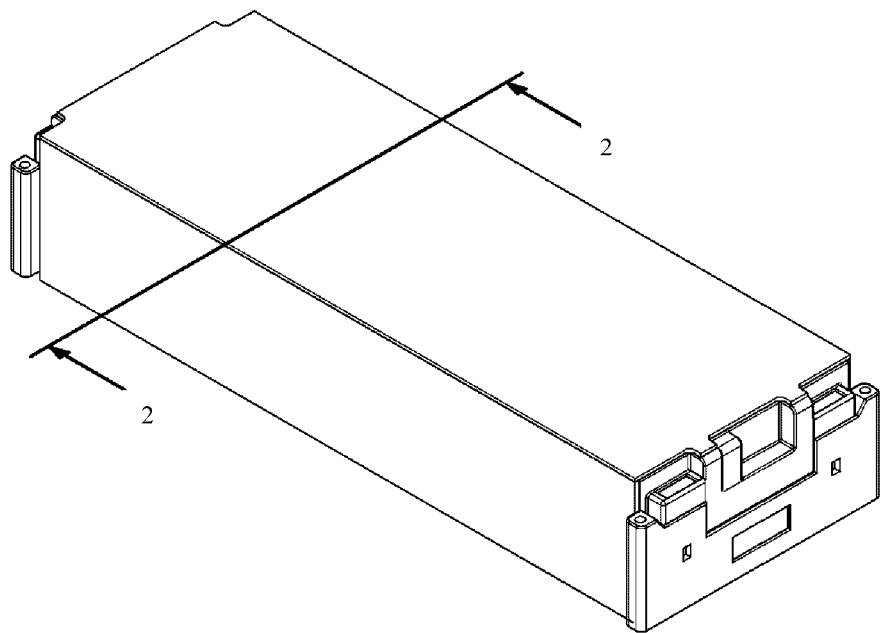
Conventional Art

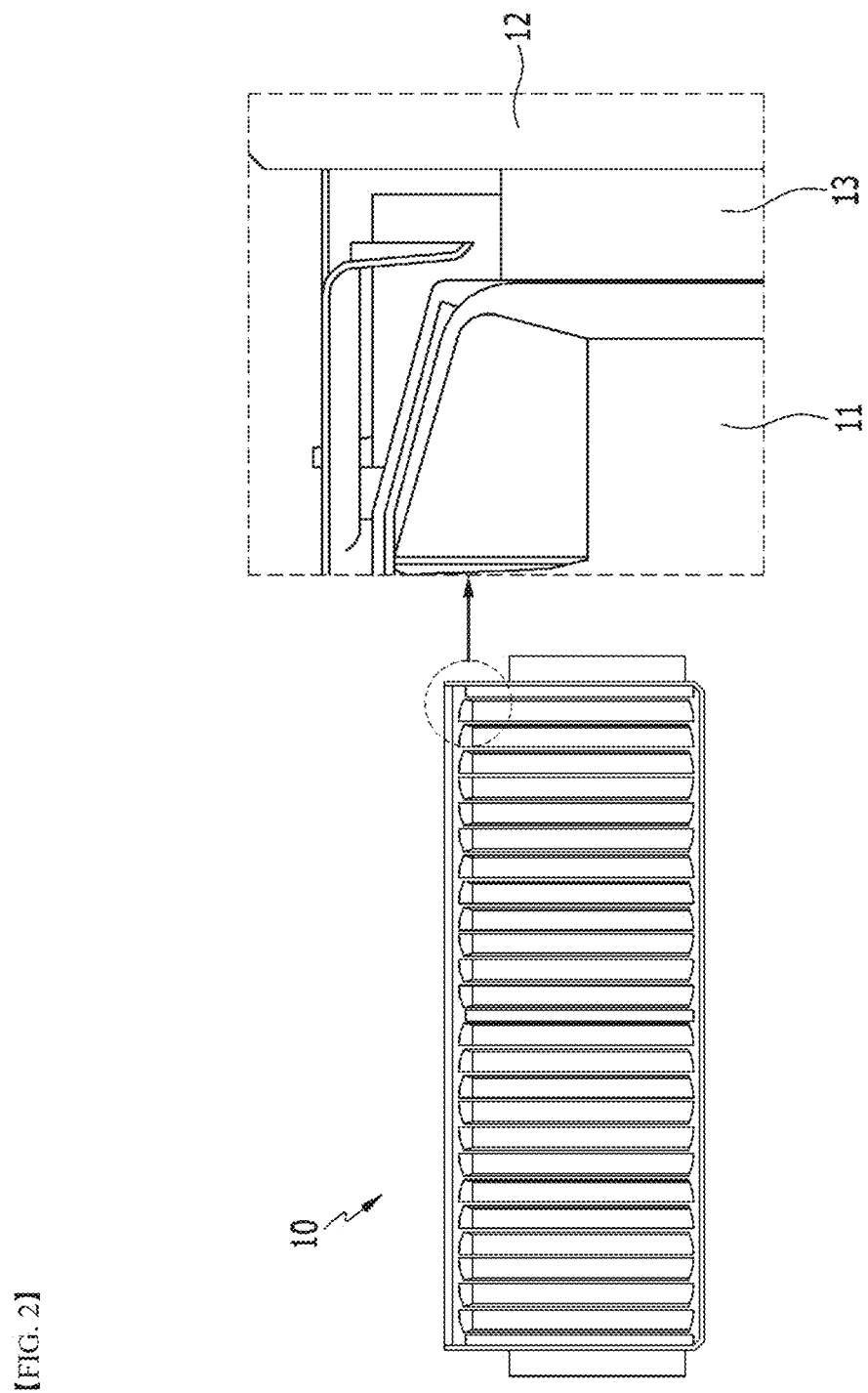
[FIG. 2]

[FIG. 3]
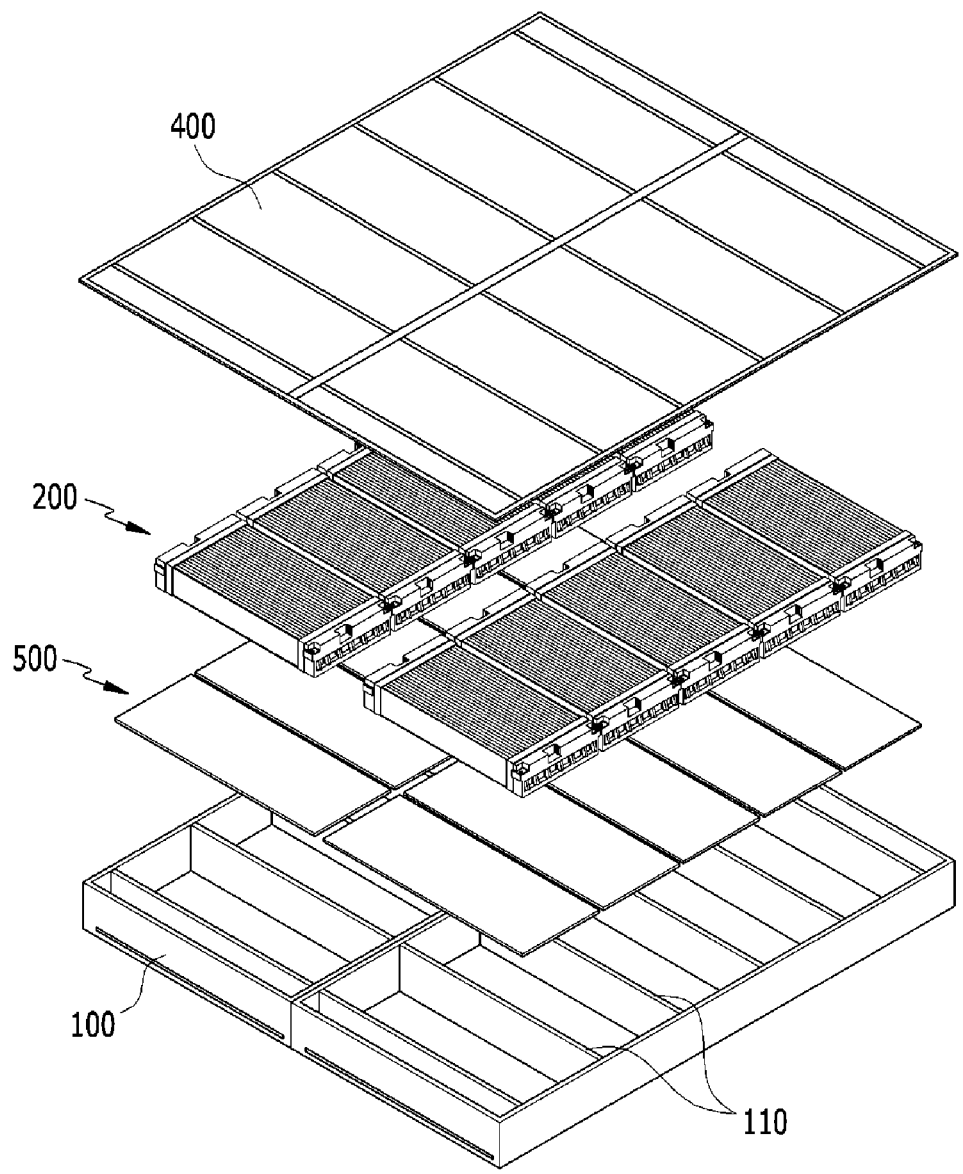

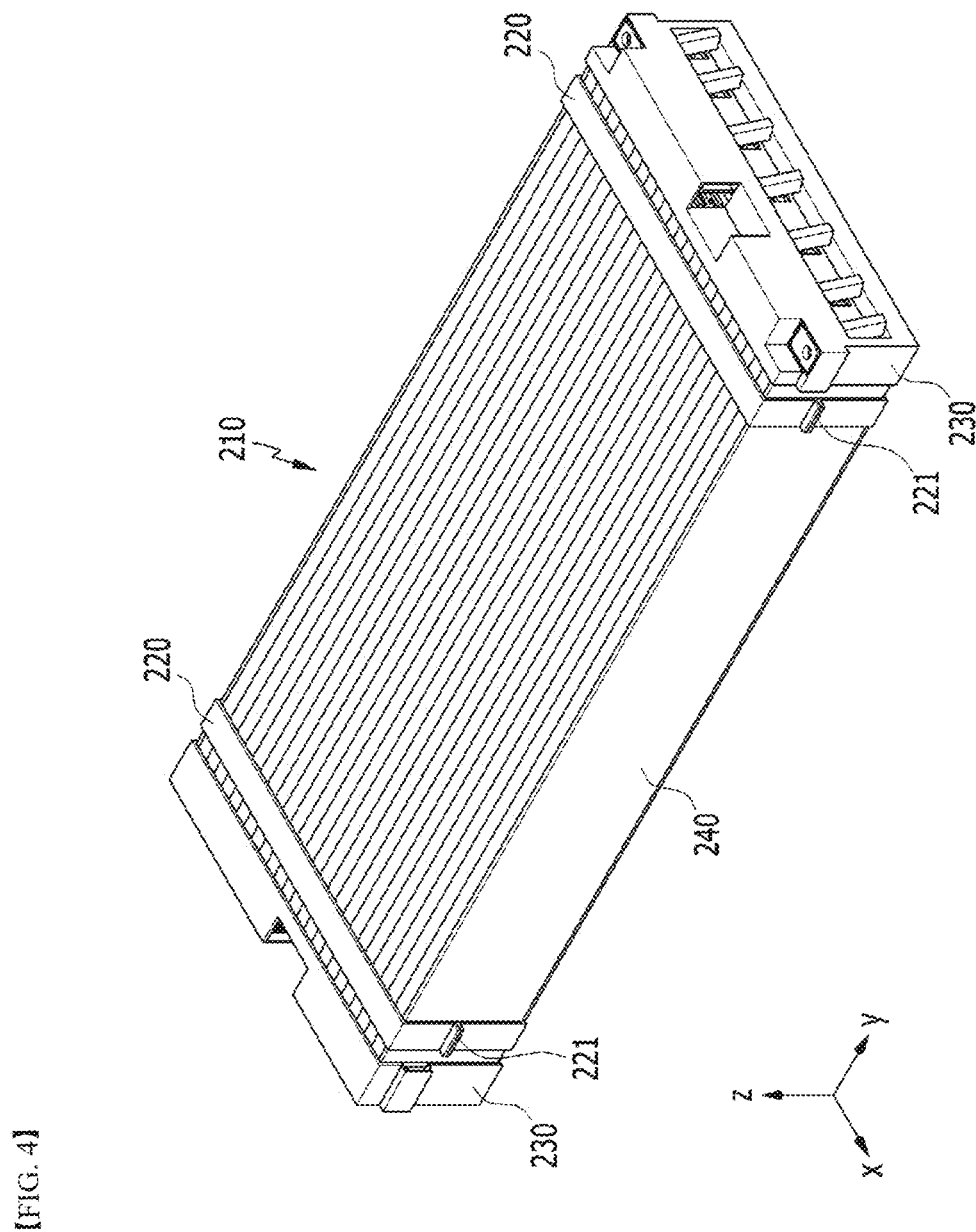
[FIG. 4]

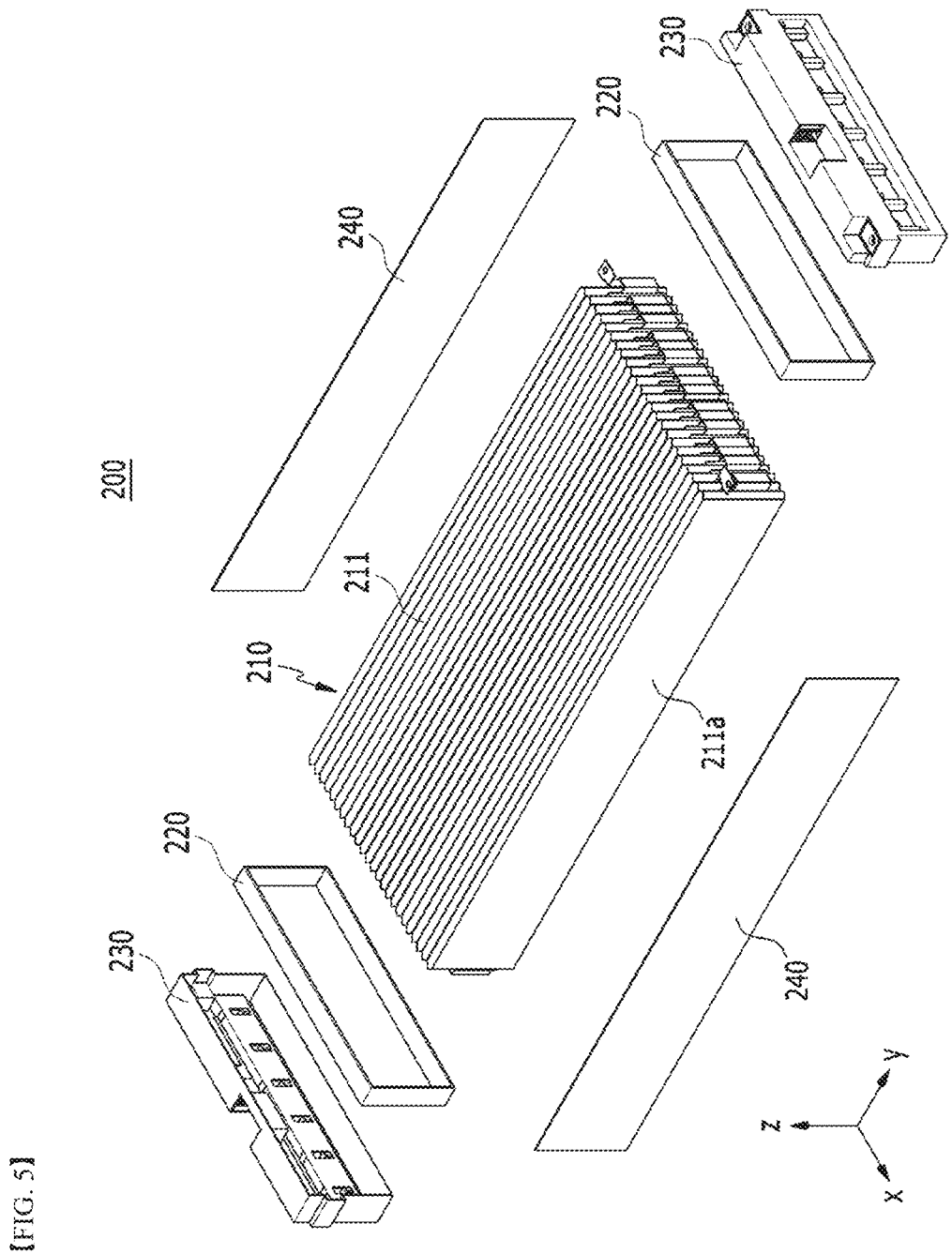

[FIG. 6]
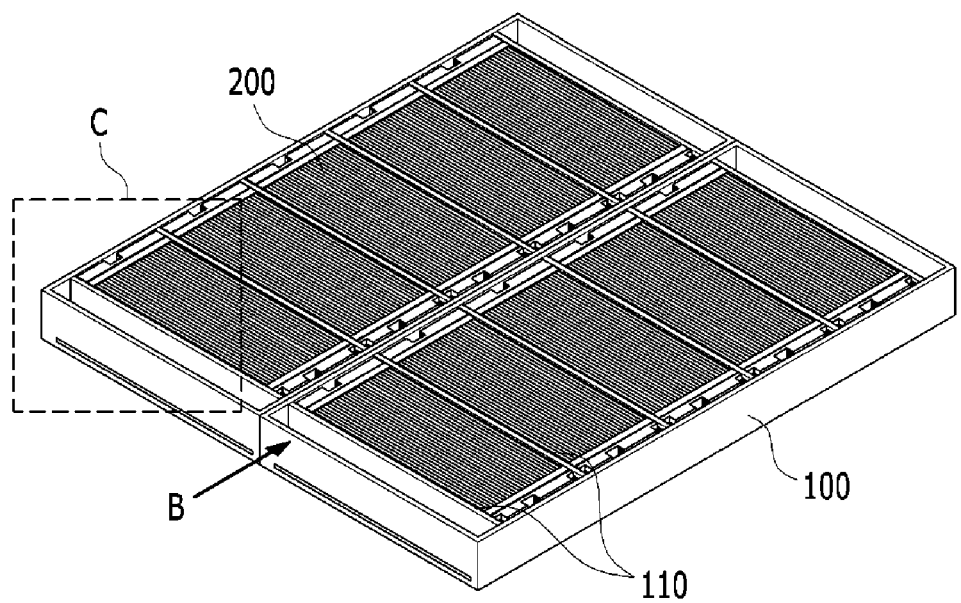
[FIG. 7]
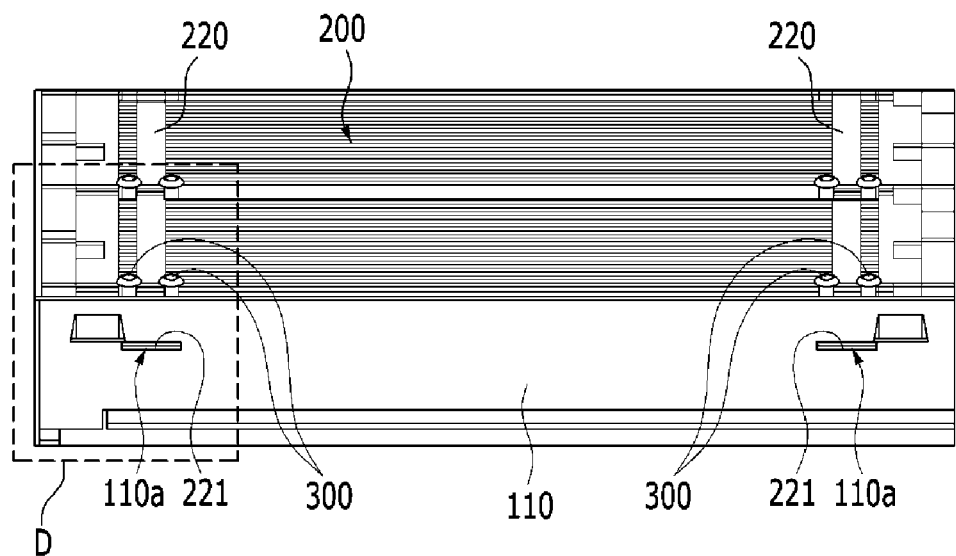

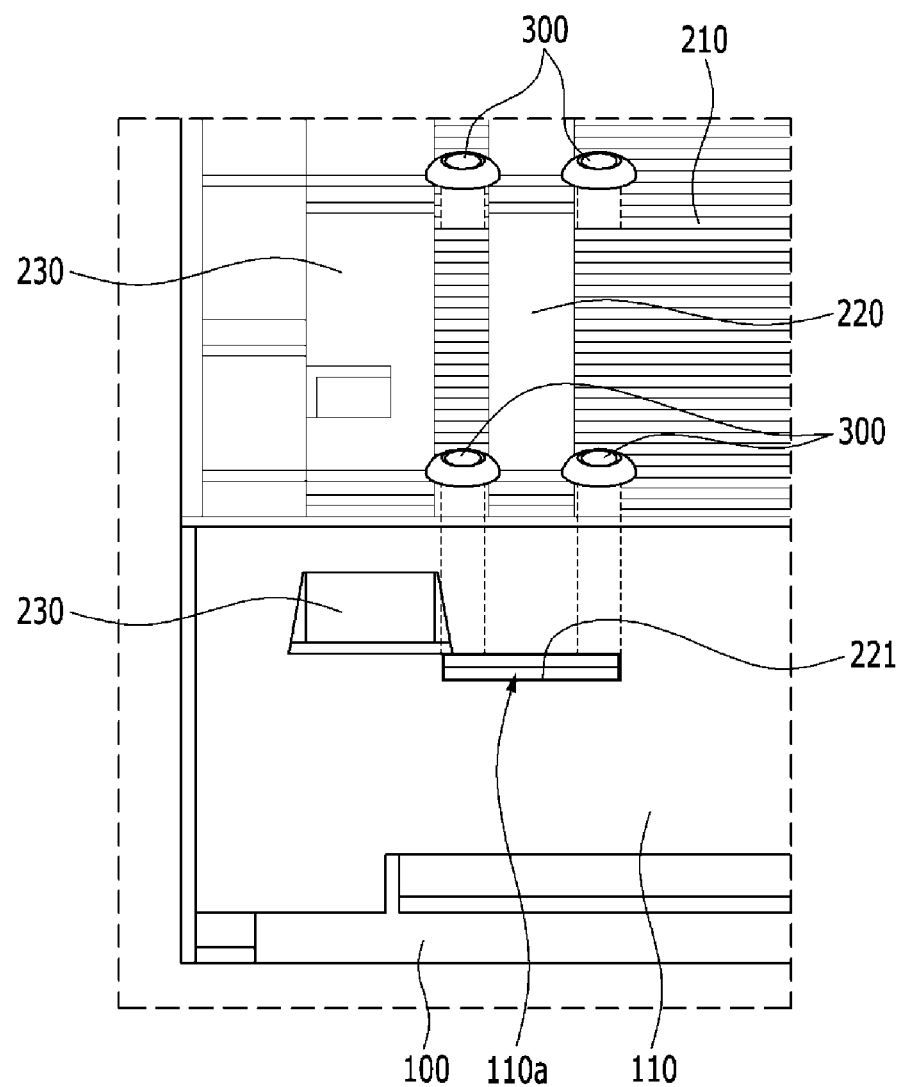
[FIG. 8]

[FIG. 9]
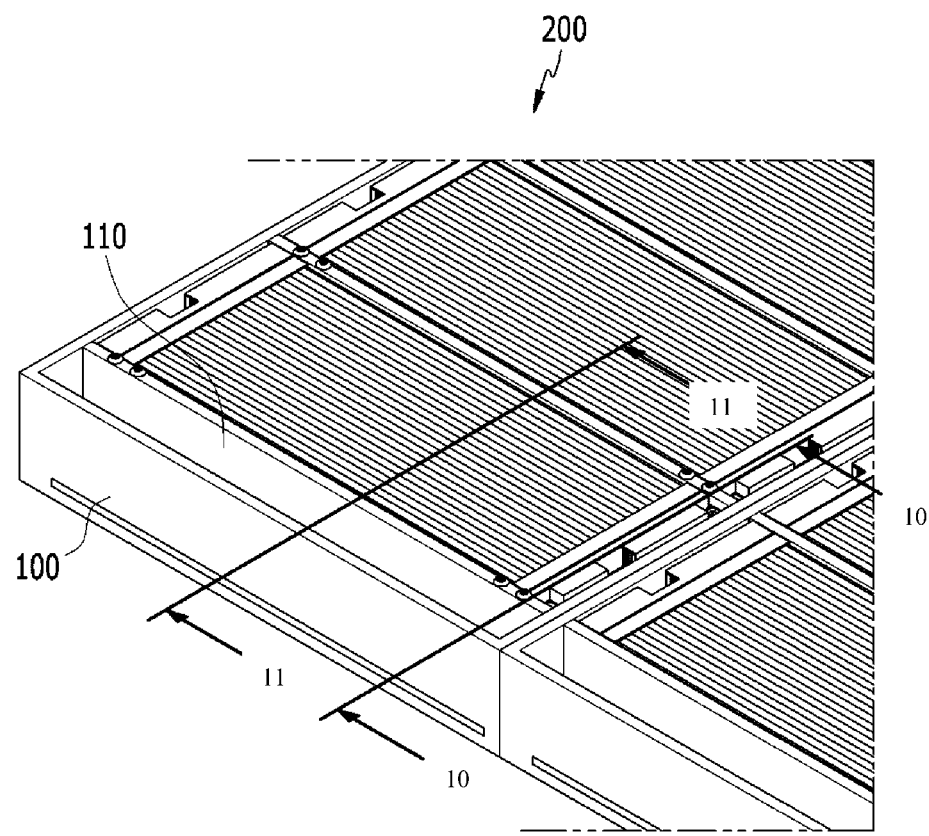

[FIG. 10]
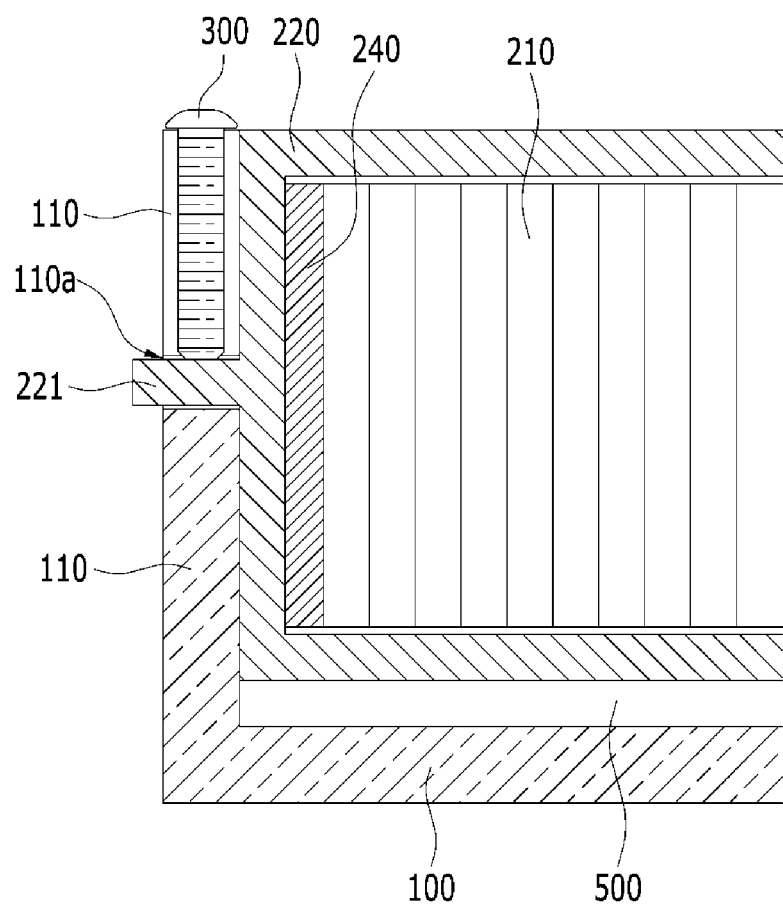

[FIG. 11]
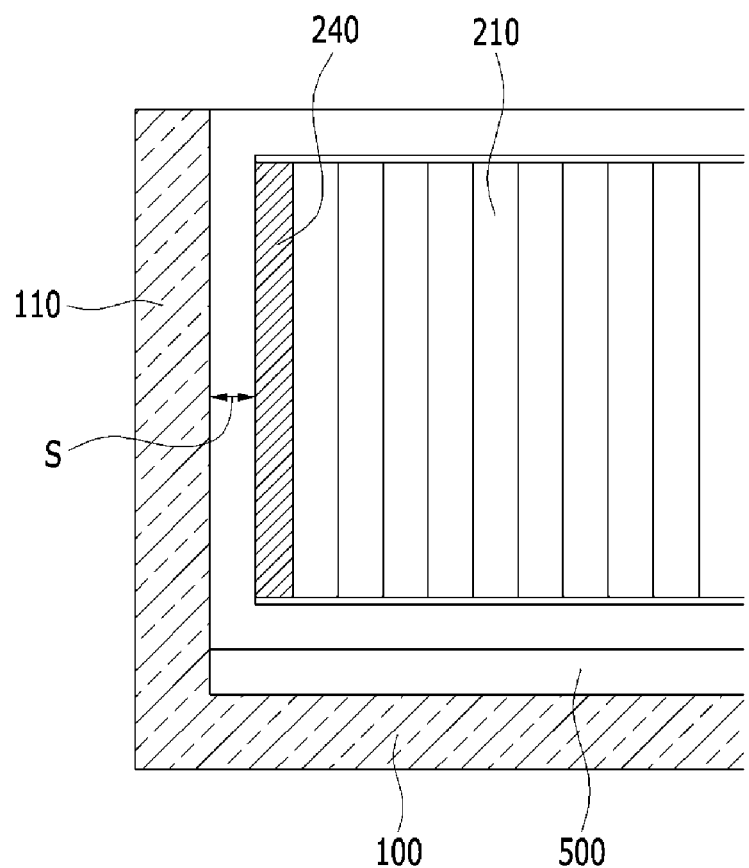

BATTERY PACK AND DEVICE INCLUDING THE SAME

TECHNICAL FIELD

Cross Citation with Related Application(s)

This application claims the benefit of Korean Patent Application No. 10-2020-0080829 filed on Jul. 1, 2020 with the Korean Intellectual Property Office, the disclosure of which is incorporated herein by reference in its entirety.

The present disclosure relates to a battery pack and a device including the same, and more particularly, to a battery pack including a swelling absorption and coupling structure of battery cells and a device including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

However, when configuring a battery pack using a battery module, a two-step assembly process, in which a battery cell is manufactured in units of battery modules, and then the battery modules manufactured in units of battery modules is housed in the battery pack again, is required, which causes a problem that an overall manufacturing process is complicated.

FIG. 1 is a perspective view showing a conventional battery module. FIG. 2 is a cross section view along line 2-2 of FIG. 1, which is a cross-sectional view showing a conventional battery module into which a compression pad is inserted.

Referring to FIGS. 1 and 2, the conventional battery module 10 may include a compression pad 13 formed between the battery cell 11 and the frame 12 so as to come into contact with the battery cell 11. When the swelling of the battery cell 11 has occurred, the compression pad 13 absorbs the swelling of the battery cell 11 through contraction, thereby minimizing the morphological deformation of the battery module 10.

However, when a battery pack is configured using a battery module, a two-step assembly process, in which a battery module including a battery cell and a compression pad for absorbing the swelling is manufactured, and then the battery modules is again housed in a battery pack, is required, which causes a problem that the overall manufacturing process is complicated. In addition, when battery cells are directly housed in a battery pack without manufacturing a battery module, a member for absorbing the swelling of the battery cells housed in the battery pack may be required.

DETAILED DESCRIPTION OF THE INVENTION

Technical Problem

It is an object of the present disclosure to provide a battery pack that simplifies the manufacturing process of the battery pack, and a device pack including the same.

It is another object of the present disclosure to provide a battery pack including a structure that absorbs the swelling between a battery cell and a battery pack and couples the battery cell to the battery pack, and a device pack including the same.

The objects of the present disclosure are not limited to the aforementioned objects, and other objects which are not described herein should be clearly understood by those skilled in the art from the following detailed description.

Technical Solution

According to one embodiment of the present disclosure, there is provided a battery pack comprising: a lower pack housing having a plurality of module regions; a partition wall that partitions the lower pack housing into the plurality of module regions; a cell block that is mounted in one of the plurality of module regions; and a coupling member that couples the cell block and the partition wall, wherein the cell block comprises a battery cell stack formed by stacking a plurality of battery cells; and a side surface plate located between the battery cell stack and the partition wall.

The cell block may further include a holding band formed so as to wrap the periphery of the battery cell stack.

The coupling member may couple the holding band and the partition wall to each other.

The side surface plate contacts an outermost battery cells on both sides of the battery cell stack, and the holding band may be formed so as to wrap the periphery of the battery cell stack and the side surface plate.

The holding band may be formed at a front end and a rear end of the battery cell stack, respectively.

Holding band protrusions may be formed at a center of a side of the holding band.

The coupling member may couple the holding band protrusion and the partition wall to each other.

An opening may be formed in the portion of the partition wall corresponding to the holding band protrusion, and the holding band protrusion may be inserted into the opening.

The coupling member may be a bolt.

The bolt penetrates the partition wall from an upper side to a lower side, and comes into contact with the holding band protrusion inserted into the opening, and the holding band protrusion is pressurized from an upper side to a lower side, so that the holding band protrusion and the partition wall formed on the lower side of the holding band protrusion can be coupled to each other.

The bolt may be provided to each of two holding band protrusions formed on opposite sides of the holding band, and pressurize the holding band protrusions, respectively.

The side surface plate may be formed of an elastic member.

The side surface plate may come into contact with the battery cell stack and may be separated from the partition wall.

The cell block may have a holding band formed so as to wrap the periphery of the battery cell stack, and the side surface portions of the holding band may be located at both ends between the side surface plate and the partition wall, so that a space is formed between the side surface plate and the partition wall.

The side surface plate having elastic force may be curved toward the partition wall when a swelling phenomenon of the battery cell stack occurs, so that the swelling of the battery cell stack is absorbed.

The partition wall may be formed of a material having high rigidity.

The cell block may have a protrusion, and the lower pack housing may have an aperture receiving the protrusion.

According to one embodiment of the present disclosure, there is provided a device comprising the above-mentioned battery pack.

The device may comprise a coupling member securing the protrusion to the lower pack housing.

Advantageous Effects

A battery pack and a device including the same according to one embodiment of the present disclosure can absorb the swelling of the battery cells directly housed in the battery pack through the side surface plate and the partition wall, and can couple the battery cells and the side surface plate to the battery pack through the coupling member.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing a conventional battery module;

FIG. 2 is a cross section view along line 2-2 of FIG. 1;

FIG. 3 is an exploded perspective view showing a battery pack according to one embodiment of the present disclosure;

FIG. 4 is a diagram showing a cell block according to one embodiment of the present disclosure;

FIG. 5 is an exploded perspective view of a cell block according to one embodiment of the present disclosure;

FIG. 6 is a diagram showing a state in which the battery pack according to an embodiment of the present disclosure is assembled;

FIG. 7 is a view showing a section B of FIG. 6;

FIG. 8 is an enlarged view of a section D of FIG. 7;

FIG. 9 is an enlarged view of a section C of FIG. 6;

FIG. 10 is a cross-sectional view showing a cross section view along line 10-10 of FIG. 9; and FIG. 11 is a cross-sectional view showing a cross section view along line 11-11 of FIG. 9.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Below, the structure of a battery module according to one embodiment of the present disclosure will be described with reference to FIGS. 3 to 6.

FIG. 3 is an exploded perspective view showing a battery pack according to one embodiment of the present disclosure. FIG. 4 is a diagram showing a cell block according to one embodiment of the present disclosure. FIG. 5 is an exploded perspective view of a cell block according to one embodiment of the present disclosure. FIG. 6 is a diagram showing a state in which the battery pack according to an embodiment of the present disclosure is assembled.

Referring to FIGS. 3 to 6, a battery module according to one embodiment of the present disclosure includes a lower pack housing 100 having a plurality of module regions, a partition wall 110 that partitions the plurality of module regions, and a cell block 200 mounted in each of the plurality of module regions.

The lower pack housing 100 houses a plurality of cell blocks 200. The plurality of module regions of the lower pack housing 100 can be formed into a size corresponding to the size of the cell block 200, and the plurality of cell blocks 200 may be respectively seated in a plurality of module regions. According to this embodiment, the plurality of cell blocks 200 may be arranged in two rows along the stacking direction of the battery cells.

A partition wall 110 may be formed between module regions to partition the module regions. The partition wall 110 may be formed so as to face side surfaces of the cell block 200 seated in the module regions. The lower pack housing 100 and the partition wall 110 formed therein can protect the plurality of cell blocks 200 from external impacts.

The thermal conductive resin layer 500 may be formed on the bottom surface of the lower pack housing 100. The thermal conductive resin layer 500 may transfer heat generated from the plurality of cell blocks 200 arranged in each of the plurality of module regions to the outside of the battery pack. The thermal conductive resin layer 500 may be formed by curing the coated thermal conductive resin. The cell block 200 may be seated in each of the plurality of module regions before the thermal conductive resin is cured. Heat transferred to the thermal conductive resin layer 300 may be discharged to the outside through the lower side of the lower pack housing 100.

According to the embodiment of the present disclosure, the battery pack may further include an upper pack housing 400 for covering an upper portion of the cell block 200. The upper pack housing 400 may be coupled with the lower pack housing 100 and the partition wall 110 formed in the lower pack housing 100. Through the upper pack housing 200, the plurality of cell blocks 200 can be fixed in up and down directions, and the plurality of cell blocks can be protected from external force.

Conventionally, as shown in FIGS. 1 and 2, a dual assembly structure, in which a battery cell stack and various components connected thereto are assembled to form a battery module, and a plurality of battery modules are housed in a battery pack again, has been adopted. However, as shown in FIG. 3, the battery pack according to this embodiment includes a battery cell stack 210, and is formed in a module-less structure in which the cell block 200 from which the module frame is removed is directly coupled to the lower pack housing 100 forming the battery pack, so that it is possible to form a battery pack structure having a simple structure in which the cell block including the battery cell stack is coupled directly to the battery pack housing structure, without the necessity of manufacturing a separate battery module as in the prior art. Thereby, the overall manufacturing process of the battery pack can be simplified, the manufacturing costs of the battery pack can be reduced, and the weight of the battery pack can be reduced. In addition, it has an advantage that reassembling properties are advantageous during the battery pack assembly process, which can be distinguished in that the conventional battery module has a disadvantage that the module frames are welded together, making it difficult to reassemble in the event of a defect.

The cell block 200 includes a battery cell stack 210 in which a plurality of battery cells 211 are stacked, and a side surface plate 240 located between the battery cell stack 210 and the partition wall 110.

Referring to FIGS. 3 and 4, the battery cell 211 is a secondary battery and can be configured into a pouch-type secondary battery. Such a battery cell 211 may be composed of a plurality of cells, and the plurality of battery cells 211 may be stacked together so as to be electrically connected with each other, thereby forming the battery cell stack 100. Each of the plurality of battery cells may include an electrode assembly, a cell case, and an electrode lead protruding from the electrode assembly.

The cell block 200 may further include a holding band 220 formed so as to wrap the periphery of the battery cell stack 210. The holding band 220 is provided around the front and rear ends of the battery cell stack 210, respectively, and can perform the role of fixing the front and rear ends of the battery cell stack 210. Here, the front and rear ends of the battery cell stack 210 may refer to both ends in the longitudinal direction (y-axis) of the battery cell stack 210. The cell block 200 according to this embodiment does not have a fixing member such as a module frame in a conventional battery module, and thus, the battery cell stack 210 composed of a plurality of battery cells is fixed using a fixing material such as the holding band 220, whereby the battery cell stack 210 can be stably seated in a plurality of module regions. The holding band 220 may be made of a material having elastic force.

The cell block 200 may further include a battery cell stack 210 in which a plurality of battery cells are stacked, and an insulating cover 230 coupled to front and rear surfaces of the battery cell stack 210. The insulating cover 230 may cut off electrical connection between the electrode leads formed on the front and back surfaces of the battery cell stack 210 and the outside. Thereby, the cell block 200 can acquire electrical stability.

The cell block 200 may further include a side surface plate 240 formed so as to come into contact with the outermost battery cells 211a on both sides of the battery cell stack 210. The side surface plate 240 is a plate-shaped member, can supplement the rigidity of the cell block 200 and at the same time, is formed of a member having elasticity, thereby capable of absorbing the swelling of the battery cell stack 210. The side surface plate 240 may include a plastic material that can be manufactured by injection molding. In some cases, a leaf spring material can be applied to the side surface plate 240. According to this embodiment, the holding band 220 is formed so as to wrap the battery cell stack 210 and the side surface plates 240 coupled to both sides of the battery cell stack 210 at one time, so that the battery cell stack 210 and the side surface plate 240 can be fixed at one time.

Below, a battery pack having a coupling member according to one embodiment of the present disclosure will be described with reference to FIGS. 6 to 10.

FIG. 6 is a diagram showing a state in which the battery pack according to an embodiment of the present disclosure is assembled. FIG. 7 is a view showing a section B of FIG. 6. FIG. 8 is an enlarged view of a section D of FIG. 7. FIG. 9 is an enlarged view of a section C of FIG. 6. FIG. 10 is a cross-sectional view showing a cross section view along line 10-10 of FIG. 9.

Referring to FIGS. 6 to 10, the battery pack according to this embodiment includes a coupling member 300 that couples the cell block 200 and the partition wall 110. More specifically, as shown in FIG. 10, the coupling member 300 can couple the holding band 220 and the partition wall 110 to each other.

According to the embodiment of the present disclosure, a holding band protrusion 221 is formed at the center of both sides of the holding band 220, as shown in FIGS. 7, 8 and 10, and the coupling member 300 can pressurize the holding band protrusion 221 to couple the holding band protrusion 221 and the partition wall 110 to each other. Here, both sides of the holding band 220 may be a portion located close to the side surface plate 240. Both sides of the holding band 220 may be portions located close to the outermost battery cell 211 of the battery cell stack 210. The holding band protrusion 221 may be a portion that protrudes toward the partition wall 110 on the periphery of the holding band 220. The holding band protrusion 221 may be a portion where both ends of the holding band 220 wrapping the cell block 200 meet. Alternatively, the holding band protrusion 221 may be a portion in which a portion of the holding band 220 wrapping the cell block 200 overlaps. Therefore, the thickness of the holding band protrusion 221 may be thicker than the thickness of other portions of the holding band 220.

An opening 110a may be formed in a portion of the partition wall 110 corresponding to the holding band protrusion 221. Referring to FIGS. 7 and 8, the holding band protrusion 221 may be inserted into the opening 110a. According to this embodiment, the coupling member 300 may be provided as a bolt 300. Referring to FIG. 10, the bolt 300 may penetrate the partition wall 110 from an upper side to a lower side and come into contact with the holding band protrusion 221 inserted into the opening 110a. In addition, the bolt 300 can pressurize the holding band protrusion 221 from an upper side to a lower side to couple the holding band protrusion 221 and the partition wall 110 formed under the holding band protrusion to each other. Here, the upper side may be in the +z-axis direction, and the lower side may be in the −z-axis direction.

Referring to FIGS. 7 and 8, the holding band protrusion 221 may be formed on both sides of the holding band 220, respectively, and the bolt 300 may be respectively provided on the two holding band protrusions 221 formed on both sides of the holding band 220. The bolt 300 can fix the holding band 220 to the partition wall 110 by pressurizing each of the holding band protrusions 221. The bolt 300 can be respectively formed on both sides of the holding band protrusion 221 to pressurize both ends of the holding band protrusion 221, respectively, and fix the holding band 220 to the partition wall 110.

The holding band 220 is fixed to the partition wall 110, whereby the battery cell stack 210 wrapped by the holding band 220 is coupled with the lower pack housing 100 including the partition wall 110, so that the cell block 200 can be fixed to the battery pack. Through the coupling structure of the holding band 220, not only the fixing force of the cell block 200 itself but also the fixing force between the cell block 200 and the housing can be secured. The holding band 220 can contribute to the stable coupling of the battery cells to the inside of the battery pack. In addition to the bolt according to this embodiment, various types of coupling materials capable of coupling the holding band 220 and the partition wall 110 to the holding band 220 can be provided as the coupling member 300.

Below, the structure and function of the side surface plate according to one embodiment of the present disclosure will be described with reference to FIGS. 10 and 11.

FIG. 11 is a cross-sectional view showing a cross section view along line 11-11 of FIG. 9.

The side surface plate 240 according to this embodiment may be formed between the battery cell stack 210 and the partition wall 110. In this case, the side surface plate 240 may be formed so as to be separated from the partition wall 110 while coming into contact with the battery cell stack 210. The side surface portions of the holding band 220 shown in FIG. 10 are located at both ends between the side surface plate 240 and the partition wall 110, so that a space S between the side surface plate 240 and the central portion of the partition wall 110 can be secured.

As a space is formed between the side surface plate 240 and the partition wall 110, the side surface plate 240 having elastic force is curved toward the partition wall 110 when a swelling phenomenon of the battery cell stack 210 occurs, so that the swelling of the battery cell stack 210 can be naturally absorbed. In this case, the partition wall 110 may be formed of a material having high rigidity. The partition wall 110 formed of a material with high rigidity can withstand the pressurizing force of the side surface plate 240 curved through swelling, and prevent deformation of the pack housing.

The battery pack according to embodiments of the present disclosure can have a structure that is packed by adding a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the principles of the invention described in the appended claims. Further, these modified embodiments should not be understood individually from the technical spirit or perspective of the present disclosure.

DESCRIPTION OF REFERENCE NUMERALS

100: lower pack housing
110: partition wall
110a: opening
200: cell block
210: battery cell stack
211: battery cell
211a: outermost battery cell
220: holding band
221: holding band protrusion
230: insulating cover
240: side surface plate
300: coupling member
400: upper pack housing
500: thermal conductive resin layer

The invention claimed is:

1. A battery pack comprising:
   a lower pack housing having a plurality of module regions;
   a partition wall that extends vertically from a bottom wall of the lower pack to partition the lower pack housing into the plurality of module regions;
   a cell block that is mounted in one of the plurality of module regions; and
   a coupling member that couples the cell block and the partition wall,
   wherein the cell block comprises:
      a battery cell stack formed by stacking a plurality of battery cells; and
      at least one side surface plate located between the battery cell stack and the partition wall, and
   wherein the coupling member extends vertically into the partition wall,
   wherein the coupling member is releasable attached to the partition wall,
   wherein the cell block has a protrusion and the lower pack housing has an aperture receiving the protrusion, and
   wherein the coupling member secures the protrusion to the lower pack housing.

2. The battery pack of claim 1, wherein the cell block further comprises a holding band formed so as to wrap a periphery of the battery cell stack,
   wherein the holding band extends across a top and a bottom of the cell block.

3. The battery pack of claim 2, wherein the coupling member couples the holding band and the partition wall to each other.

4. The battery pack of claim 2, wherein the at least one side surface plate is a pair of surface plates contacting an outermost battery cells on both sides of the battery cell stack, respectively, and
   wherein the holding band is formed so as to wrap the periphery of the battery cell stack and the pair of side surface plates.

5. The battery pack of claim 2, wherein the holding band is formed at a front end and a rear end of the battery cell stack, respectively.

6. The battery pack of claim 2, wherein the protrusion is a holding band protrusion formed on the holding band, and wherein the holding band protrusion is formed at a center of a side of the holding band.

7. The battery pack of claim 6, wherein the coupling member couples the holding band protrusion and the partition wall to each other.

8. The battery pack of claim 6, wherein an opening is formed in the portion of the partition wall corresponding to the holding band protrusion, and wherein the holding band protrusion is inserted into the opening.

9. The battery pack of claim 8, wherein the coupling member is a bolt.

10. The battery pack of claim 9, wherein the bolt penetrates the partition wall from an upper side to a lower side, and comes into contact with the holding band protrusion inserted into the opening, and wherein the holding band protrusion is pressurized from an upper side to a lower side, so that the holding band protrusion and the partition wall formed on a lower side of the holding band protrusion are coupled to each other.

11. The battery pack of claim 9, wherein the bolt is provided to each of two holding band protrusions formed on opposite sides of the holding band, and pressurize the holding band protrusions, respectively.

12. The battery pack of claim 1, wherein the at least one side surface plate is formed of an elastic member.

13. The battery pack of claim 1, wherein the at least one side surface plate contacts the battery cell stack and is separated from the partition wall.

14. The battery pack of claim 13, wherein the cell block further comprises a holding band formed so as to wrap the periphery of the battery cell stack, and wherein a side surface portion of the holding band is between the at least one side surface plate and the partition wall, so that a space is formed between the at least one side surface plate and the partition wall.

15. The battery pack of claim 14, wherein the at least one side surface plate is curved toward the partition wall when a swelling phenomenon of the battery cell stack occurs, so that the swelling of the battery cell stack is absorbed.

16. The battery pack of claim 15, wherein the partition wall is formed of a material having high rigidity.

17. A device comprising the battery pack of claim 1.

18. The battery pack of claim 2, wherein the coupling member contacts the holding band.

* * * * *